J. H. BOEHME.
MARKER FOR PLANTERS.
APPLICATION FILED NOV. 6, 1919.
1,405,480.
Patented Feb. 7, 1922.
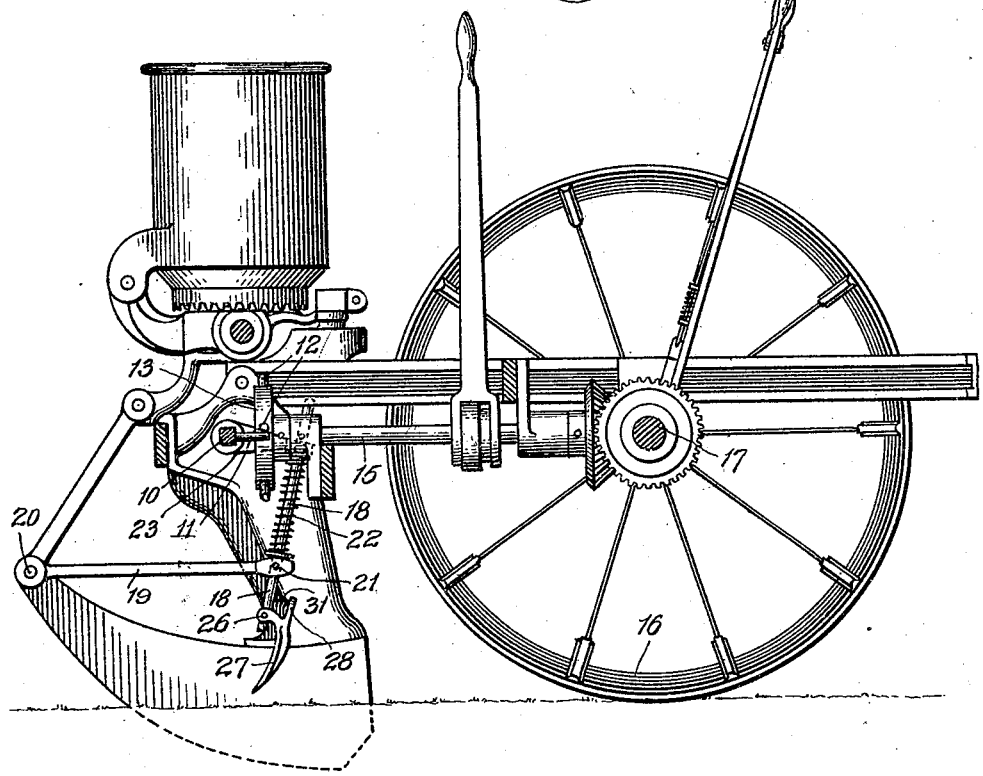
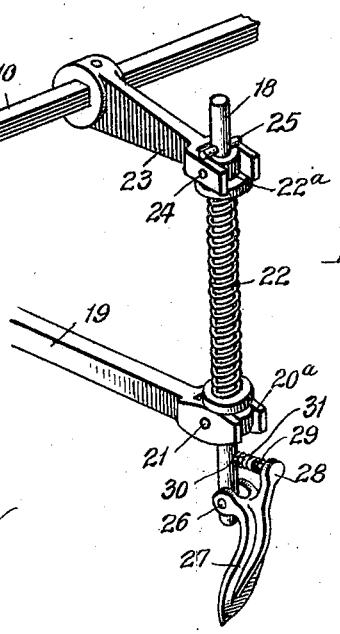
Witness:
John Enders
Inventor
John H. Boehme,
by Clarence J. Loftus
Atty.

UNITED STATES PATENT OFFICE.

JOHN H. BOEHME, OF ONAWA, IOWA.

MARKER FOR PLANTERS.

1,405,480.  Specification of Letters Patent.  Patented Feb. 7, 1922.

Application filed November 6, 1919. Serial No. 336,050.

*To all whom it may concern:*

Be it known that I, JOHN H. BOEHME, residing at Onawa, in the county of Monona, State of Iowa, a citizen of the United States, have invented a new and useful Marker for Planters, of which the following is a specification.

The object of my invention is to provide a new, simple, durable, inexpensive and efficient marker for planters. It is a further object to provide an apparatus of this class so designed as to make a mark on the surface of the ground at the point where the seed or plants are dropped. It is peculiarly adapted for use in connection with the wireless planter shown and described in United States Letters Patent No. 1,089,458, issued to John H. Boehme, et al, March 10, 1914, but of course it may be used in connection with any suitable planter, wireless or otherwise.

The above and other features of novelty, advantages and capabilities will become apparent from a detailed description of the accompanying drawings in which I have illustrated one embodiment of my invention but the construction there shown is to be understood as illustrative only and not as defining the limits of my invention.

Figure 1. is a longitudinal, central, sectional view of a wireless planter such as shown and described in the above mentioned patent with one embodiment of my marker attached thereto, and Figure 2. is an enlarged perspective view of the marker detached from the planter.

As the planter itself is shown and fully described in the above mentioned patent I do not believe it will be necessary to go into the construction in detail except to say that the planter is of the wireless type in which the dropping mechanism for the seed or plants is operated by a shaft "10" which has secured thereto a pin "11" designed to be engaged by a plurality of pins "12" on a rotatable disk or wheel "13" which disk is fast to a longitudinal, rotatable shaft "15" which shaft is rotated by the traction wheels "16" through a bevel gear arrangement, one of said gears being on the shaft "17" of the planter and the other on the shaft "15" in mesh therewith, so that when the traction wheels "16" are rotated, the shaft "15" is caused to rotate and as it rotates the pins on the disk "13" engage with the pin "11" on the shaft "10" and partially rotates said shaft for operating the dropping mechanism.

Referring now to the marker as shown in the accompanying drawings. It consists of a plunger "18" exteriorly positioned on both sides of each shoe or furrow opener which plunger is pivotally connected near its lower end by means of a link "19" to the forward point of the shoe by means of a bolt "20." The end of the link "19" connecting with the plunger "18" is bifurcated and fits around the collar "20ᴬ" which is also fast to the plunger in common with the link "19" by means of the pin or bolt "21." Mounted on the plunger "18" is a compression spring "22" which is at its lower end secured by any suitable means to the collar "20" and at its upper end to the collar "22ᴬ." The latter collar is slideable on the plunger "18" and is connected to the bifurcated arm "23" by means of the pin "24" which arm is rigidly connected to the shaft "10" and rotatable therewith. To limit the upward movement of the collar "22ᴬ" and bifurcated arm "23" on the plunger "18" I have provided a stop pin "25" extending through the plunger "18." Pivotally connected to the lower end of the plunger by means of a pin "26" is a marker shovel "27" which shovel has an upwardly extending lug "28" and an inwardly extending pin "29" which pin cooperates with a like pin "30" on the plunger "18" for retaining the small compression spring "31."

In operation, assuming the parts are assembled as shown in Figure 1., the traction wheel "16" through the gear arrangement causes the pins on the disk "13" to engage the pin "11" on the shaft "10" and partially rotate said shaft for operating the drop mechanism. Simultaneously with this operation the bifurcated end of the arm "23" moves downwardly and through the compression spring "22" causes the inner end of the link "19" and plunger "18" and the shovel "27" to move downwardly, the latter making a mark on the surface at the point where the seed or plant is dropped. The shaft "10" for the drop mechanism returns to its normal position after the pin on the disk "13" passes the pin "11" by means of a spring not shown. However, should the planter trip fail to raise the shovel out of the ground the spring "22" which acts as a safety device, will raise the shovel and assist in returning the shaft "10" to its normal position.

This marking arrangement has many advantages, particularly with a wireless planter. Among others it indicates clearly just where the seed or plant has been dropped so that the operator of the planter on finishing one row, can, preparatory to starting another row, adjust his planter in order to get the seed or plants in alinement with the previously planted rows. Of course, it can also be used very beneficially in all kinds of planters for it is desirable for many reasons to know just where the seed or plant has been dropped. Aside from these broad general advantages the particular construction of the marker has many other advantages. For example, it is resilient throughout its connections. The bifurcated arm "23" has a highly resilient and elastic connection with the plunger by means of the coil spring "22" and collar "20ᴬ" so that there is considerable room for give in the event the marker comes in contact with a hard substance or object. Again the marker has a further elastic or resilient feature in that the compression spring "31" adds a high degree of resiliency or elasticity should the shovel strike a hard substance. The importance of the resilient or elastic connection betwen the bifurcated arm and the plunger and the shovel is marked, for with such a construction there is little, if any, chance of the marker being rendered inoperative or being broken by the shovel coming in contact with a hard substance or object.

From this it will be seen that I have produced a new and very efficient marker for planters which will readily respond to the conditions in use without being broken or rendered inoperative.

Having thus described my invention what I claim is:

1. In a planter, an oscillating shaft for operating the drop mechanism, an arm fixed to said shaft, a plunger slideable with respect to said arm and yieldingly connected thereto, and a marker on the lower end of said plunger for the purpose set forth.

2. In a planter, an oscillating shaft for operating the drop mechanism, an arm fixed to said shaft, a plunger yieldingly connected to said arm, a marker pivotally connected to the lower end of said plunger, and means for yieldingly holding said marker in normal position.

3. In a planter provided with a shoe, an oscillating shaft for operating the drop mechanism, an arm fixed to said shaft, a plunger operatively connected to said arm, a link adapted to pivotally connect the lower end of said plunger with the forward end of the shoe and a marker connected to the lower end of said plunger.

4. In a planter provided with a shoe, an oscillating shaft for operating the drop mechanism, an arm fixed to said shaft, a rod operatively connected to said arm, a link adapted to pivotally connect the lower end of said rod with the forward end of the shoe, a marker pivotally connected to the lower end of said rod, and means for yieldingly holding the marker in normal position.

5. In a planter provided with an oscillating shaft for operating the drop mechanism, an arm fixed to said oscillating shaft, a plunger yieldingly connected with said arm, a marker pivotally connected with the lower end of said plunger and means for yieldingly holding said marker in normal position.

6. In a device of the class described adapted to be pivotally connected with the dropping mechanism of a planter, comprising a plunger yieldingly and operatively connected with said drop mechanism, a marker pivotally connected to the lower end of said plunger, a link adapted to pivotally connect the lower end of said plunger with the forward end of the shoe of the planter, and means for yieldingly holding said marker in normal position.

In witness whereof, I hereunto subscribe my name to this specification in the presence of two witnesses.

JOHN H. BOEHME.

Witnesses:
H. D. CLARK,
V. H. PATRICK.